Patented Dec. 13, 1949

2,491,412

UNITED STATES PATENT OFFICE 2,491,412

CERAMIC PRODUCT AND METHOD OF MAKING

René Lecuir, Paris, France, assignor to Societe Française Radio Electrique, a corporation of France No Drawing. Application November 27, 1945, Serial No. 631,227. In France October 26, 1943

Section 1, Public Law 690, August 8, 1946
Patent expires October 26, 1963

4 Claims. (Cl. 106—62)

The present invention is for improvements in or relating to ceramic products and particularly to a new ceramic product of great hardness and to its method of preparation.

The fired materials prepared according to the invention are characterised by mechanical and thermal properties superior to those of porcelain and of steatite.

The constitution of the starting paste consists essentially in a high alumina content, the use of clay as binder, of an alkaline earth carbonate as flux and the presence of steatite.

The following formula given by way of example has been found to give a paste of excellent quality:

Alumina _____ 57.10
Clay _____ 11.60
Calcium carbonate _____ 24.10
Luzenac steatite _____ 7.20

Luzenac steatite, having a composition $3MgO, 4SiO_2, H_2O$, comes within the general definition of steatite and is distinguished by being of particularly high quality.

The calcium introduced in the form of carbonate may be replaced by the carbonates of barium or strontium.

The alumina may be replaced by a refractory oxide of suitable physical and chemical properties, in particular by glucina, also known as beryllium oxide or beryllia.

The paste is fired at 1430° C. for a short time or at 1420° for three hours.

The hardness of the product obtained is 9 measured by the Mohs scale. Consequently, by way of example, the new product can take the place of porcelain for use in grinding apparatus, where it is desired to grind metal surfaces or it can be formed into tiles for covering walls and floors.

After grinding for 48 hours with its weight of water, a paste corresponding to the formula given above, is suitable for moulding and reproduces the finest details of a plaster mold. It is perfectly suitable for making so-called "biscuit ware" similar to those produced in the manufacture of porcelain.

What I claim is:

1. A fired ceramic product comprising by weight about 57.1% of a refractory oxide base selected from the group consisting of alumina and glucina, about 24.1% of a carbonate flux selected from the group consisting of calcium carbonate, barium carbonate and strontium carbonate, about 11.6% clay as a binder, and about 7.2% steatite.

2. The method of making fired ceramic biscuit-type products which comprises preparing a paste having about 57.1% of a refractory oxide base selected from the group consisting of alumina and glucina, about 24.1% of a carbonate flux selected from the group consisting of calcium carbonate, barium carbonate, and strontium carbonate, about 11.6% clay as a binder and about 7.2% steatite, grinding this paste with about an equal weight of water, molding the ground product and firing the molded product.

3. The method set forth in claim 2 wherein the firing temperature is about 1420° to 1430° C.

4. The method set forth in claim 2 wherein the firing temperature is about 1420° C. and the firing period comprises about three hours' time.

RENÉ LECUIR.

REFERENCES CITED

The following references are of record in the file of this patent:

UNITED STATES PATENTS

| Number | Name | Date |
|---|---|---|
| 2,227,770 | Ungewiss | Jan. 7, 1941 |

FOREIGN PATENTS

| Number | Country | Date |
|---|---|---|
| 396,532 | Great Britain | 1933 |

OTHER REFERENCES

Ries: Clays (1927), chapter II, pp. 52 et seq.